United States Patent
Patino

(10) Patent No.: US 7,135,837 B2
(45) Date of Patent: Nov. 14, 2006

(54) METHOD AND SYSTEM FOR SELECTIVLY DIVERTING CURRENT DURING CHARGING OF MULTIPLE BATTERIES

(75) Inventor: Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 357 days.

(21) Appl. No.: 10/741,652

(22) Filed: Dec. 19, 2003

(65) Prior Publication Data

US 2005/0134219 A1 Jun. 23, 2005

(51) Int. Cl.
*H01M 10/44* (2006.01)
*H01M 10/46* (2006.01)

(52) U.S. Cl. ..................... 320/125

(58) Field of Classification Search ........... 320/107, 320/116, 117, 119, 120, 124, 125
See application file for complete search history.

(56) References Cited

U.S. PATENT DOCUMENTS

| | | | |
|---|---|---|---|
| 5,122,722 A | 6/1992 | Goedken et al. | |
| 5,157,320 A | 10/1992 | Kuriloff | |
| 5,218,286 A | 6/1993 | Van Dunk | |
| 5,479,083 A * | 12/1995 | Brainard | 320/121 |
| 5,677,613 A * | 10/1997 | Perelle | 320/122 |
| 5,689,171 A | 11/1997 | Ludewig | |
| 5,764,030 A | 6/1998 | Gaza | |
| 5,920,179 A | 7/1999 | Pedicini | |
| 6,150,795 A * | 11/2000 | Kutkut et al. | 320/118 |
| 6,157,173 A | 12/2000 | Baranowski et al. | |

OTHER PUBLICATIONS

SBS Implementers Forum—Smart Battery Data Accuracy Testing Guideline—Revision 1.0, Release Candidate A, Benchmarq Microelectronics Inc. et al., Dec. 11, 1998.

* cited by examiner

*Primary Examiner*—Edward H. Tso
(74) *Attorney, Agent, or Firm*—Larry G. Brown

(57) ABSTRACT

The invention concerns a method (300) for charging a set of batteries. The method includes the steps of charging (314) a first battery (116) with a charging current from a power supply (138), monitoring (316) a parameter of the first battery during the charging step and selectively diverting (318) at least a portion of the charging current used to charge the first battery to charge a second battery (118). The first and second batteries are charged simultaneously after the parameter of the first battery reaches a predetermined threshold. As an example, the parameter can be a battery voltage or a battery temperature rate.

20 Claims, 6 Drawing Sheets

300

322 INCREASE THE PORTION OF THE CHARGING CURRENT THAT IS DIVERTED TO CHARGE THE SECOND BATTERY IN WHICH THE PORTION OF THE CHARGING CURRENT THAT IS DIVERTED REACHES THE MAXIMUM VALUE WHEN THE CHARGING CURRENT USED TO CHARGE THE FIRST BATTERY REACHES THE MINIMUM VALUE

END 324

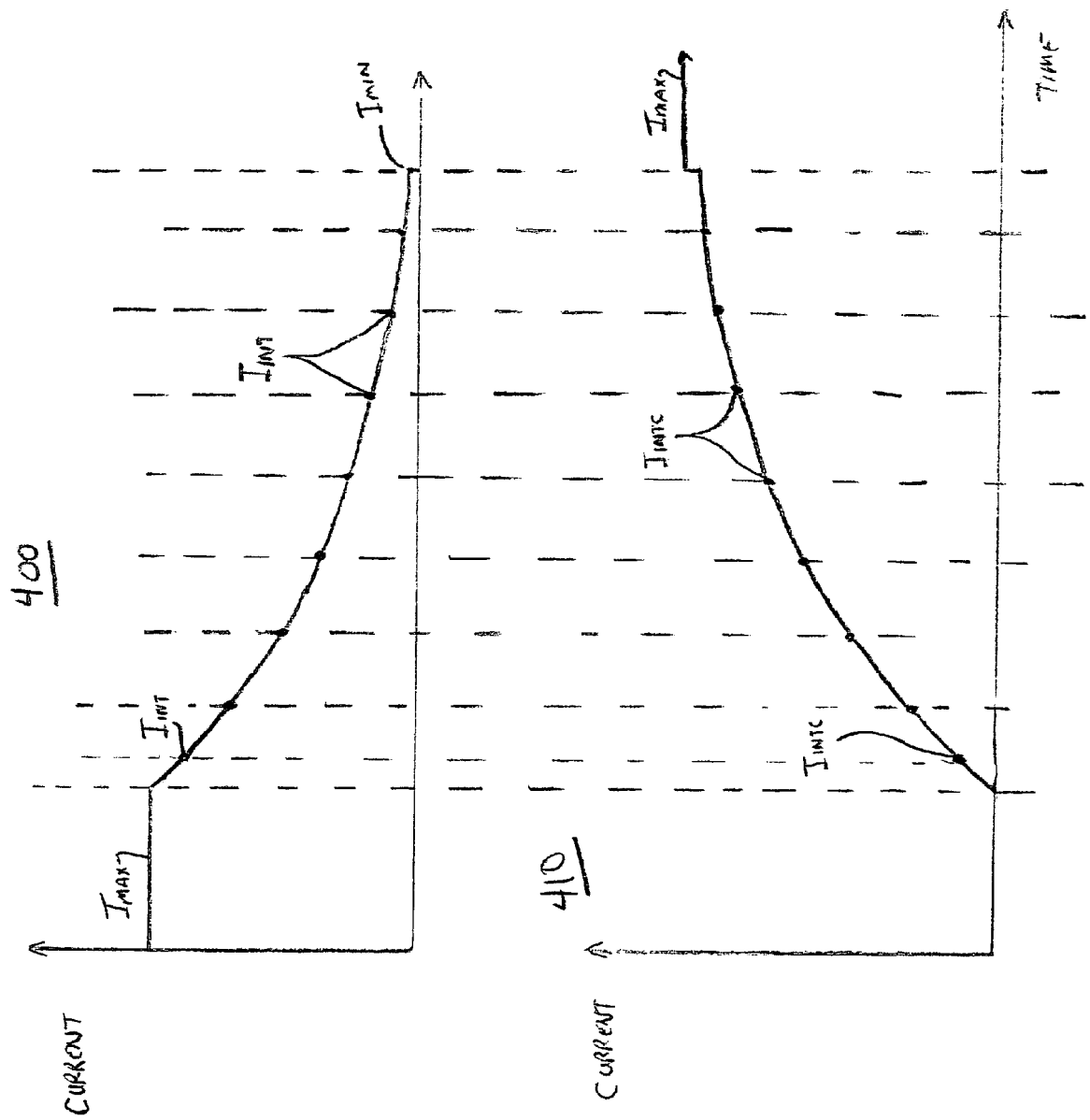

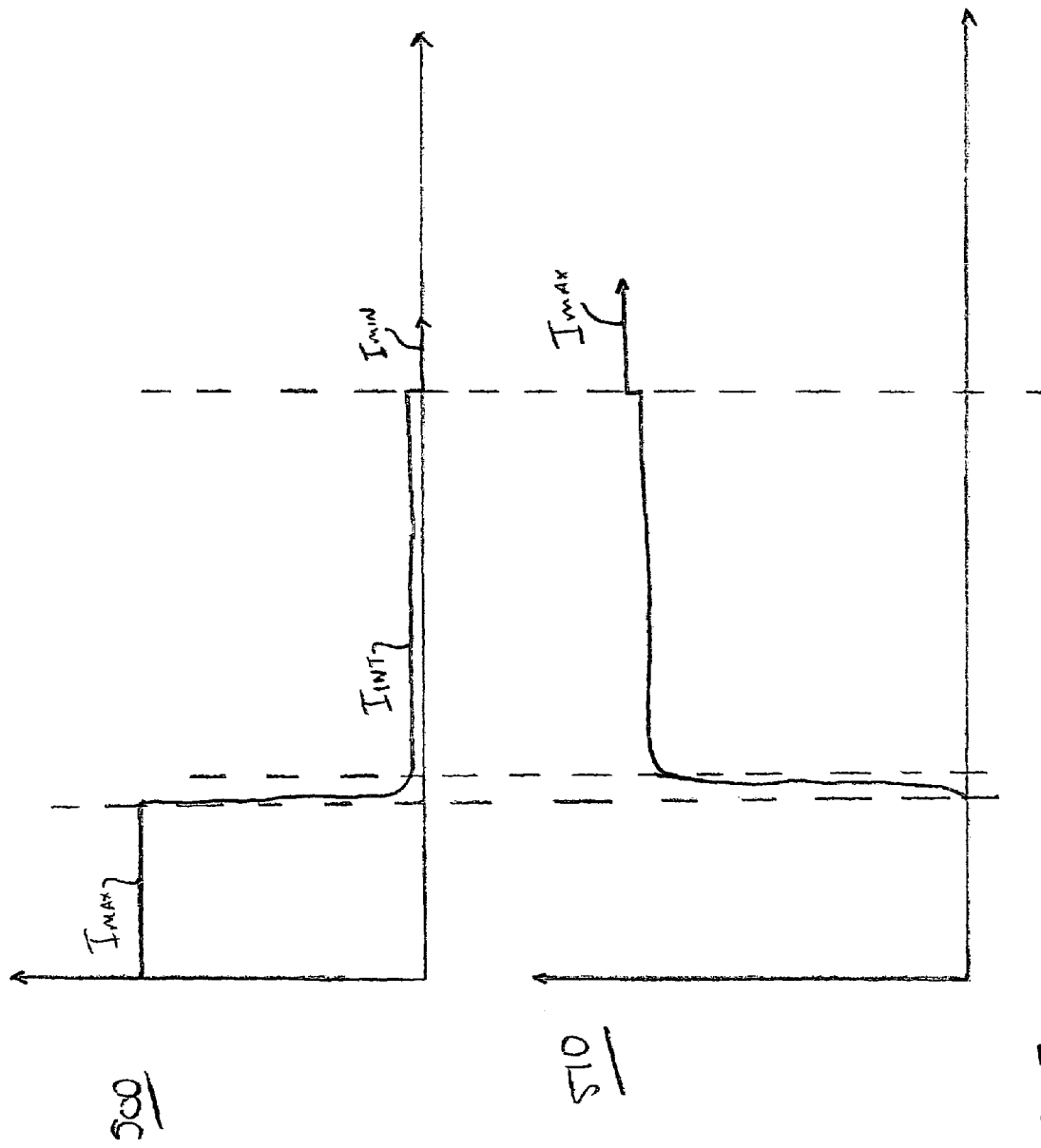

METHOD AND SYSTEM FOR SELECTIVLY DIVERTING CURRENT DURING CHARGING OF MULTIPLE BATTERIES

BACKGROUND OF THE INVENTION

1. Field of the Invention

This invention relates in general to rechargeable batteries and more particularly to methods used to recharge such batteries.

2. Description of the Related Art

Portable electronic devices have become ubiquitous in today's society. These devices are generally powered by one or more rechargeable batteries. For example, most cellular telephones can be coupled to a charger that can charge the telephone's battery after several hours, depending on how badly the battery is depleted. Lengthy charge times, however, are a major inconvenience to consumers.

SUMMARY OF THE INVENTION

The present invention concerns a method for charging a set of batteries. The method includes the steps of charging a first battery with a charging current from a power supply, monitoring a parameter of the first battery during the charging step and selectively diverting to charge a second battery at least a portion of the charging current used to charge the first battery. The first and second batteries are charged simultaneously after the parameter of the first battery reaches a predetermined threshold. As an example, the parameter can be a battery voltage or a battery temperature rate, and the predetermined threshold can be a predetermined battery voltage or a predetermined battery temperature rate.

In one arrangement, the charging current used to charge the first battery can have a maximum value until the parameter of the first battery reaches the predetermined threshold. The method can further include the step of decreasing the charging current used to charge the first battery after the parameter of the first battery reaches the predetermined threshold. The charging current used to charge the first battery can decrease from a maximum value to a minimum value. Specifically, the charging current used to charge the first battery can decrease to at least one intermediate value as the charging current used to charge the first battery decreases to the minimum value. In another arrangement, the portion of the charging current that is diverted to charge the second battery can have a value of the difference of the maximum value of the charging current previously used to charge the first battery and the intermediate value of the charging current used to charge the first battery.

The method can further include the step of increasing the portion of the charging current that is diverted to charge the second battery. As an example, the portion of the charging current that is diverted can reach the maximum value when the charging current used to charge the first battery reaches the minimum value. As another example, the first battery can be coupled to a portable electronic device and the second battery is attachable to the portable electronic device. The method can also include the step of coupling the portable electronic device and the second battery to corresponding receptacles of a dual pocket charger.

The present invention also concerns another method of charging a set of batteries. The method can include the steps of charging a first battery with a charging current from a power supply, monitoring the charging current used to charge the first battery and in response to a change in a magnitude of the charging current, selectively diverting to charge a second battery at least a portion of the charging current used to charge the first battery. The first and second batteries are charged simultaneously after the change in the magnitude of the charging current used to charge the first battery.

The present invention also concerns a system for charging a set of batteries. The system includes at least one receptacle for charging a first battery with a charging current from a power supply and a processing unit. The processing unit is programmed to monitor a parameter of the first battery as the first battery is being charged with the charging current and selectively divert to charge a second battery at least a portion of the charging current used to charge the first battery when the processing unit detects that the parameter of the first battery reaches a predetermined threshold. The first and second batteries are charged simultaneously following the detection. The system also includes suitable software and circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 4 illustrates several graphs that demonstrate the current and voltage levels of the one or more batteries that can be charged in accordance with the method of FIG. 3; and FIG. 5 illustrates several more graphs that demonstrate the current and voltage levels of the one or more batteries that can be charged in accordance with the method of FIG. 3.

DETAILED DESCRIPTION

Figure 1:
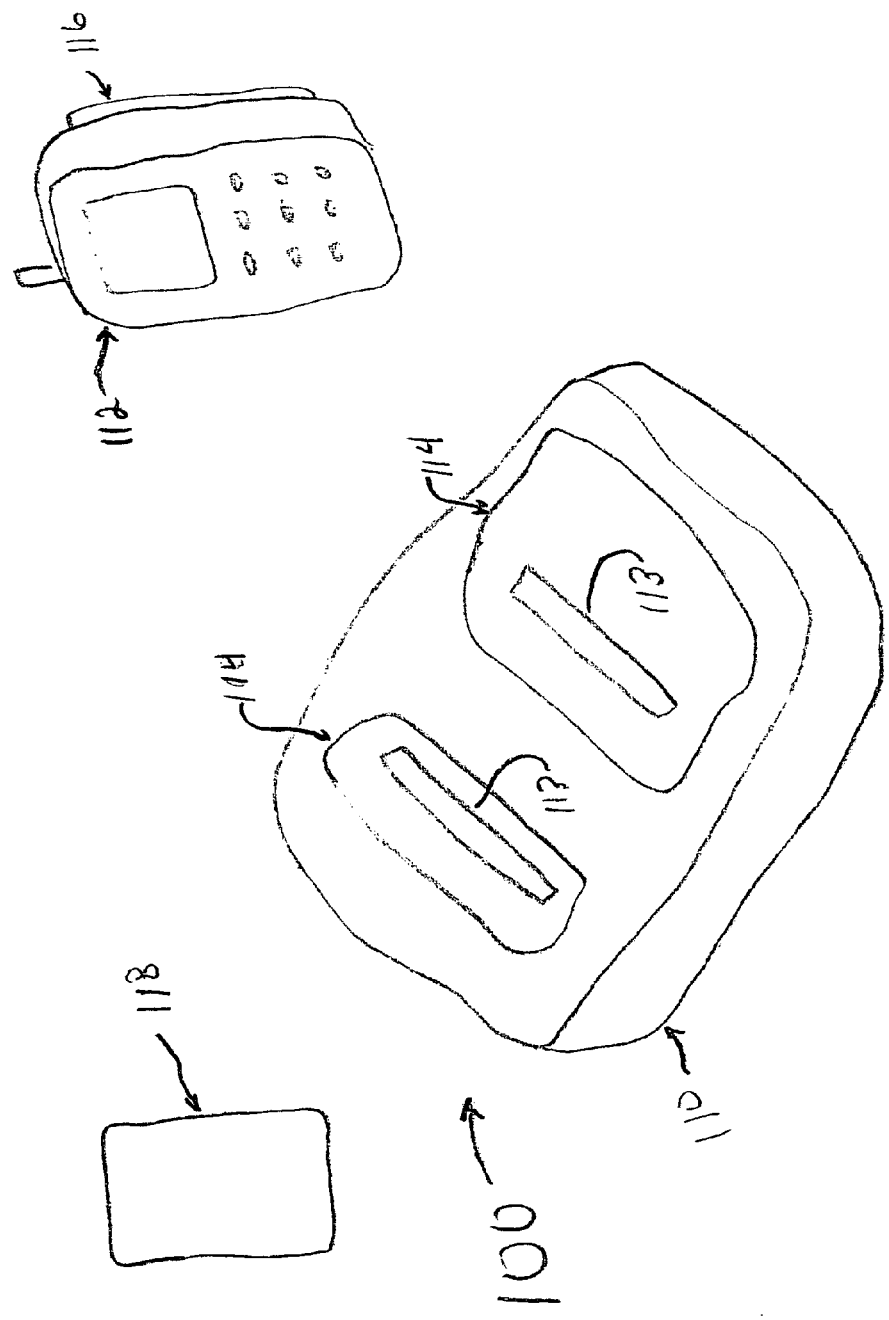
FIG. 1 illustrates an example of a system for charging one or more batteries in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, a system 100 that can be used to charge one or more batteries is shown. The system 100 can include a charger 110 for charging a portable electronic device 112 or a portable power source, such as a battery. As an example, the portable electronic device 112 can be a cellular telephone, a two-way radio, a personal digital assistant or a messaging device. It is understood, however, that the invention is not limited in this regard, as the portable electronic device 112 can be any portable unit that relies at least in part on batteries for its power supply.

The charger 110 can include one or more pockets 114 for receiving the portable electronic device 112, and the pockets 114 can include one or more receptacles 113 for transferring power from a power supply to the portable electronic device 112. For example, the portable electronic device 112 can include a first battery 116, and when the portable electronic device 112 is coupled to the receptacle 113, the first battery 116 can be charged.

In one arrangement, the charger 110 can be referred to as a dual pocket charger, which can include two pockets 114. One of the pockets 114 can be designed to receive the portable electronic device 112, and the other pocket 114 (and its receptacle 113), as alluded to earlier, can be designed to receive a second battery 118. In accordance with this example, the charger 110 can charge both the first battery 116 of the portable electronic device 112 and the second battery 118. The second battery 118 can be attachable to the portable electronic device 112 and can provide power to the portable electronic device 112. As a result, a user of the portable electronic device 112 can enjoy the benefits of a fully charged first battery 116 and can have a backup battery, i.e., the second battery 118, readily available when the charge on the first battery 116 is depleted. It must be noted, however, that the charger 110 is in no way limited to this particular configuration, as it can include any suitable number of pockets 114 for receiving any suitable type of chargeable item.

As an example, the first battery 116 and the second battery 118 can be Lithium-Ion, Nickel-Cadmium or Nickel-Metal Hydride batteries. Those of ordinary skill in the art will appreciate, however, that any other suitable type of battery can be used with the system 100.

Figure 2:
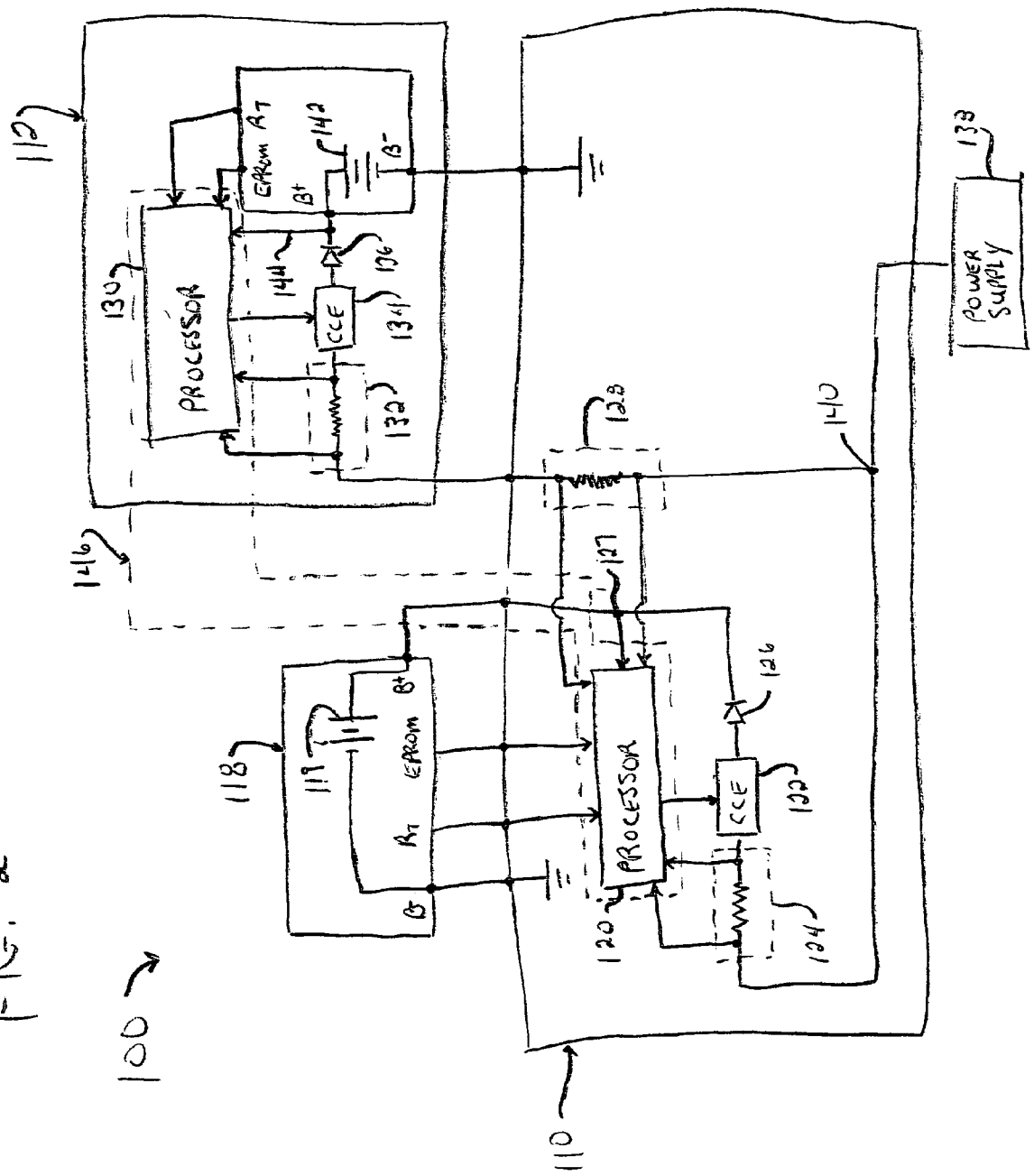
FIG. 2 illustrates an exemplary schematic of the system of FIG. 1 in accordance with the inventive arrangements.

Referring to FIG. 2, an example of a schematic of the system 100 of FIG. 1 is shown. Here, the charger 110 can include a processor 120, a current control element 122, a first current sensor 124, a diode 126 and a second current sensor 128. The output of the diode 126 can lead to a voltage input B+ for, as an example, the second battery 118. In one arrangement, the input to the first current sensor 124 can be coupled to a power supply 138 through a node 140. Through the first current sensor 124, the processor 120 can monitor the amount of current that is being transferred to a set of cells 119 of the second battery 118. The processor 120 can also regulate the amount of current flowing to the second battery 118 by controlling the operation of the current control element 122. As an example, the current control element 122 can be a field effect transistor (FET), although other suitable devices can serve as the current control element 122.

The processor 120 can monitor the voltage of the second battery 118 through an input 127. The processor 120 can also access information concerning the operating parameters of the second battery 118 through an erasable programmable read-only memory (EPROM) input and can monitor the temperature of the second battery 118 through a thermistor (RT) input. The information about the second battery 118 that can be accessed through the EPROM input can include a maximum charging voltage and a separate predetermined charging voltage, a maximum charging current, a minimum charging current and, in certain cases, a maximum temperature rate. As will be explained below, this information can be helpful during the charging process.

The portable electronic device 112 can include a processor 130, a current sensor 132, a current control element 134 and a diode 136. Similar to the second battery 118, the output of the diode 136 can lead to a voltage input B+ for, as an example, the first battery 116 of the portable electronic device 112. The input to the current sensor 132 can also be coupled to the power supply 138 through the node 140. Further, the processor 130, via the current sensor 132, can monitor the flow of current to a set of cells 142 of the first battery 116. The processor 130 can also regulate current flow to the first battery 116 by regulating the operation of the current control element 134, which, as an example, can be a FET. Those of ordinary skill in the art, however, will appreciate that the current control element 134 can be any other suitable device for regulating current flow.

Like the processor 120, the processor 130 can monitor the voltage of the first battery 116 through an input 144, can retrieve information about the first battery 116 via an EPROM input and can check the temperature of the first battery 116 through an RT input. The retrieved information can concern a maximum charging voltage and a separate predetermined charging voltage, a maximum charging current, a minimum charging current and possibly a maximum temperature rate, which the processor 130 can use to facilitate the charging of the first battery 116.

In one arrangement, the processor 120 and the processor 130 can be part of a processing unit 146, which is represented by the dashed outline in FIG. 2. In this example, the processing unit 146 can include two discrete processors, namely the processor 120 and the processor 130. Nevertheless, it is understood that the processing unit 146 can include merely one processor or more than two processors for controlling the charging of any batteries.

For example, those of ordinary skill in the art will appreciate that a single processor can be implemented in the portable communications device 112, which can be used to carry out the charging process. As a more specific example, the portable electronic device 112 can be designed to carry both the first battery 116 and the second battery 118 simultaneously. A single processor, or processing unit, in the portable electronic device 112 can monitor the current flowing to the first and second batteries 116, 118 and their voltages. Likewise, those of ordinary skill in the art will appreciate that a single processor, or processing unit, can be incorporated in the charger 110 for executing the charging sequence. This processor can also monitor current flowing to the first and second batteries 116, 118 and their voltages. A charger with a single processor may be useful in charging two batteries in which neither battery is coupled to an electronic device. It is important to stress that the invention is not limited to any of these particular examples, as other suitable configurations are within the scope of the inventive arrangements.

Figure 3A:
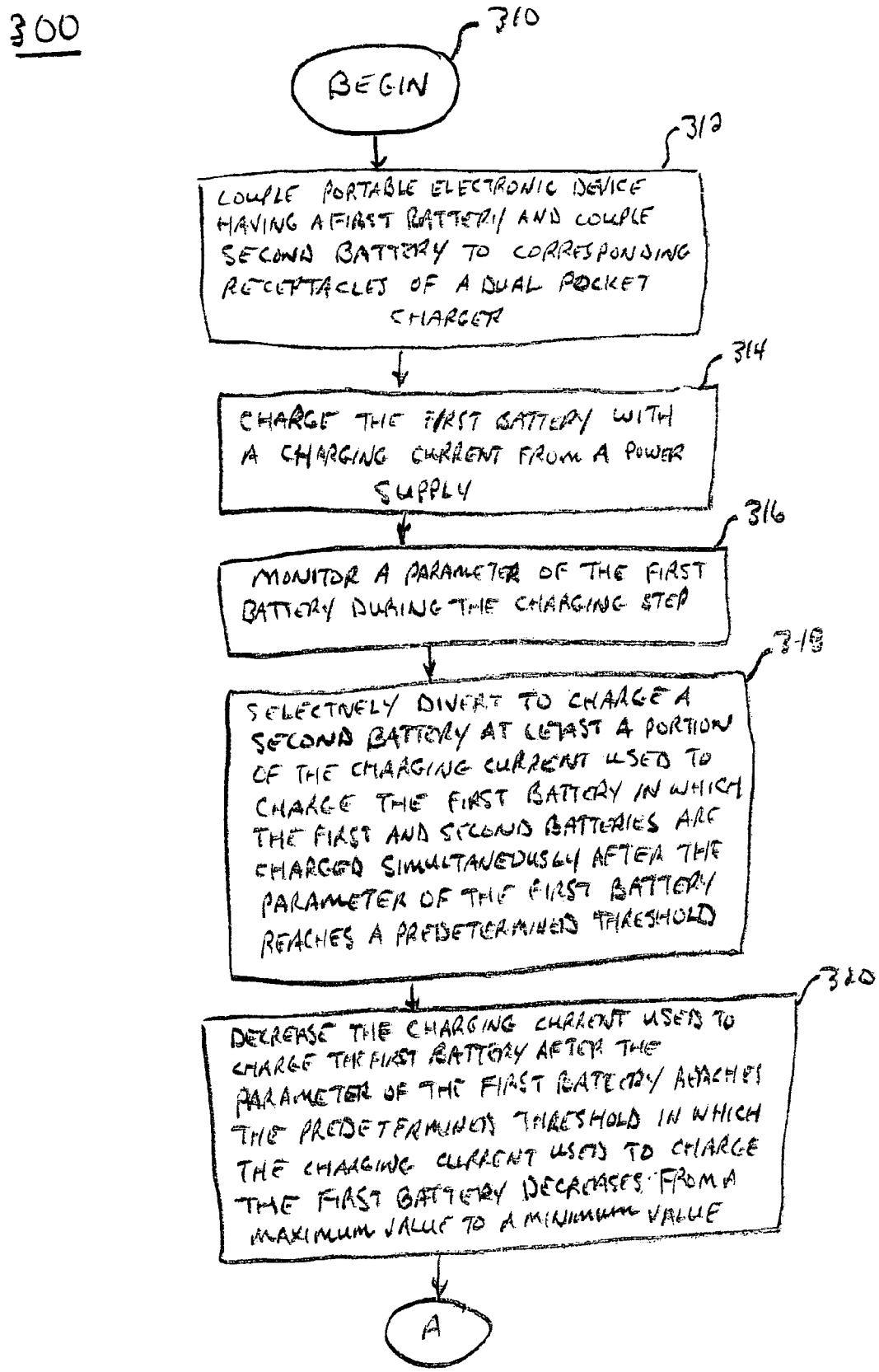
FIGS. 3A and 3B illustrate a method for charging one or more batteries in accordance with the inventive arrangements.
Figure 3B:
Figure 3B:
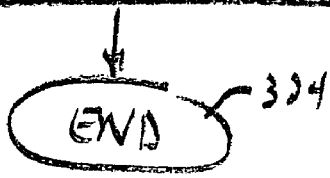

Referring to FIGS. 3A and 3B, a method 300 for charging a set of batteries is shown. To describe the method 300, reference will be made to the system 100 of FIGS. 1 and 2. It must be noted, however, that the invention is not limited in this regard, as the method 300 can be practiced in any other suitable system. Reference will also be made to FIGS. 4 and 5, which illustrate several graphs. The method 300 can begin at step 310, and at step 312, a portable electronic device having a first battery can be coupled to a dual pocket charger and a second battery can be coupled to the charger. The portable electronic device and the second battery can be coupled to corresponding receptacles of the dual pocket charger. For example, referring to FIG. 1, the portable electronic device 112 having a first battery 116 can be coupled to a receptacle 113 of a pocket 114 of the charger 110. In addition, the second battery 118 can be coupled to the receptacle 113 in the remaining pocket 114. Of course, the invention is not limited to this particular arrangement, as any other number of batteries can be coupled to any other suitable charger capable of receiving any number of elements that can be charged.

Referring back to FIG. 3A, at step 314, the fist battery can be charged with a charging current from a power supply. For example, referring to FIG. 2, the first battery 116 can be charged with a charging current from the power supply 138. In one arrangement, this charging current can be a maximum charging current, and the power supply 138 can set the magnitude of the maximum charging current. Referring to FIG. 4, a graph 400 that illustrates the maximum charging current ($I_{MAX}$) is shown. The $I_{MAX}$ can be, for example, 1C, i.e., the maximum current rating of the first battery 116. This $I_{MAX}$, however, can be more than or even less than 1C.

Referring back to FIG. 3A, at step 316, a parameter of the first battery can be monitored during the charging step. For example, referring to FIG. 2, the processor 120 of the processing unit 146 and/or the processor 130 of the processing unit 146 can monitor any suitable parameter of the first battery 116 as the first battery 116 is charged with the charging current from the power supply 138. In one arrangement, the parameter of the first battery 116 can be a battery voltage or a battery temperature rate, which can be monitored by the processor 130. The parameter of the first battery 116 can also be the charging current that the first battery 116 is receiving from the power supply 138, which can be monitored by the processor 120.

As an example, if the first battery 116 is a Lithium-Ion battery, the processor 130 can monitor the voltage of the first battery 116 through the B+ input. Additionally, if the first battery 116 is a nickel battery, the processor 130 can monitor the battery temperature rate, or the rate at which the temperature of the battery increases or decreases, by receiving signals through the $R_T$ input. In either example, the processor 120 can monitor the charging current of the first battery 116 through the second current sensor 128.

Moving back to FIG. 3A again, as shown at step 318, at least a portion of the charging current used to charge the first battery can be selectively diverted to charge a second battery. In one arrangement, this diversion can occur after the parameter of the first battery reaches a predetermined threshold. After the parameter reaches the predetermined threshold, the first and second batteries can be charged simultaneously with the charging current. At step 320, the charging current used to charge the first battery can be decreased after the parameter of the first battery reaches the predetermined threshold. This charging current can be decreased from a maximum value to a minimum value.

For example, referring to FIG. 2, if the parameter being monitored is the voltage of the first battery 116, when this voltage reaches the predetermined threshold or setting of the first battery 118, a portion of the charging current can be diverted to begin charging the second battery 118. This predetermined threshold may be the maximum charging capacity or voltage of the battery or a voltage value below the maximum charging capacity and can be obtained through the EPROM input.

In this example, the processor 130 can monitor the voltage of the first battery 116, and the processor 120 can monitor the charging current used to charge the first battery 116. When the voltage of the first battery 116 reaches its predetermined threshold, the processor 130 can reduce the magnitude of the charging current from its maximum value by manipulating the current control element 134. As a result, the charging current used to charge the first battery 116 can have a maximum value until the parameter of the first battery 116, in this case, the battery voltage, reaches the predetermined threshold. Through the second current sensor 128, the processor 120 can sense the drop in the charging current used to charge the first battery 116. In response, the processor 120 can operate the current control element 122, which can facilitate the diversion of a portion of the charging current from the power supply 138.

If the charging current used to charge the first battery 116 is considered the parameter of the first battery 116 being monitored, the predetermined threshold can be when this charging current drops below its maximum value ($I_{MAX}$). Thus, the diversion of charging current can also be considered to occur when there is a change, such as a decrease, in the magnitude of the charging current used to charge the first battery 116.

During the diversion, the processor 130 can constantly adjust the current control element 134, thereby further reducing the charging current to the first battery 116. This reduction can occur until the charging current used to charge the first battery 116 drops to a minimum value, which is shown in the graph 400 of FIG. 4 (the minimum charging current is shown as $I_{MIN}$). When the charging current used to charge the first battery 116 reaches the minimum value, the processor 130 can turn off the current control element 134 at that point or a predetermined amount of time later, and no more current from the power supply 138 will flow to the first battery 116. During this reduction, the charging current used to charge the first battery 116 can decrease to each of a series of intermediate values, which is also shown in the graph 400. The intermediate values of the charging current shown are represented by a series of dots and are labeled as $I_{INT}$. These values are merely a representation of the drop in the charging current and are in no way intended to reflect the actual decrease in current.

As noted earlier, the processor 120 can sense this drop in the charging current used to charge the first battery 116. Referring to the method 300 of FIG. 3B (through jump circle A), at step 322, the portion of the charging current that is diverted to charge the second battery can be increased. Moreover, the portion of the charging current that is diverted can reach the maximum value when the charging current used to charge the first battery reaches the minimum value. For example, referring to FIGS. 2 and 4, as the charging current that is used to charge the first battery 116 decreases, the processor 120 can correspondingly increase the amount of current flowing to the second battery 118 by adjusting the current control element 122. In one arrangement, the charging current that is diverted to the second battery 118 can have a magnitude or value that is the difference between the maximum value of the charging current previously used to charge the first battery 116 and the intermediate value of the charging current used to charge the first battery 116.

For example, the charging current that is diverted and used to charge the second battery 118 is shown in graph 410. This diverted charging current can also have intermediate values that correspond to the intermediate values of the graph 400 and can be represented by a series of dots and labeled as $I_{INTC}$. In accordance with the inventive arrangements, the $I_{INTC}$ of the diverted charging current can be the difference between the $I_{MAX}$ of graph 400 and the $I_{INTC}$'S corresponding $I_{INT}$ of graph 400. When the charging current used to charge the first battery 116 finally reaches its minimum value ($I_{MIN}$) and the processor 130 shuts off the current control element 134, all of the charging current can now be diverted to charge the second battery 118. The diverted charging current can now attain the maximum value, or $I_{MAX}$. Referring back to FIG. 3B, the method 300 can end at step 324.

The above example was described in relation to Lithium-Ion battery, although those of ordinary skill in the art will appreciate that the invention may apply to any other suitable battery. For example, referring to FIG. 5, several graphs are shown in which a graph 500 illustrates a charging current curve for a first nickel battery and a graph 510 shows a charging current curve for a second nickel battery. Like the Lithium-Ion example and referring to FIGS. 2 and 5, the first (nickel) battery 116 can be charged with a maximum charging current until a parameter of the first battery 116 reaches a predetermined threshold. Here, the predetermined threshold can be a predetermined temperature rate, such as the maximum rate of increase in the temperature of the first battery 116, which can be obtained through an EPROM input.

When this event happens, the processor 130 can decrease the amount of charging current that flows to the first battery 116. In one arrangement, this decrease can be almost immediately to a relatively low intermediate value, $I_{INT}$ (the predetermined threshold can also be when the charging current drops below its maximum value, $I_{MAX}$ and the diversion of current can be considered to occur when, for example, the magnitude of charging current used to charge the first battery 116 changes, such as when it drops below the predetermined threshold). This charging current with a low intermediate value can be used to maintain the charge on the first battery 116 and can continue for any suitable period of time.

In response, the processor 120 can sense the decrease in the charging current used to charge the first battery 116 and can manipulate the current control element 122 to increase correspondingly the amount of charging current that is diverted to the second battery 118. Similar to the Lithium-Ion example, the charging current that is diverted can have a corresponding intermediate value, $I_{INTC}$, which can be the difference between $I_{MAX}$ and $I_{INT}$ of the graph 500. Eventually, the processor 130 may stop the flow of current to the first battery 116 by shutting off the current control element 134, and the charging current used to charge the first battery 116 can drop to $I_{MIN}$, which can have a magnitude of zero. Once no more current is flowing to the first battery 116, the processor 120 can divert all the charging current to the second battery 118 such that the diverted charging current has a value of $I_{MAX}$.

Although one particular embodiment of the invention has been described as having a dual pocket charger in which Lithium-Ion or Nickel batteries, one of which is attached to a portable electronic device, are charged and two processors work in tandem to perform such a function, it is important to note that the invention is not so limited. Using the inventive method, any suitable type and number of batteries that can be used to power any suitable type of device can be charged, using any suitable charger and any suitable number of processors.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a set of batteries, comprising the steps of:
charging a first battery with a charging current from a power supply;
monitoring a parameter of the first battery during said charging step; and
selectively diverting to charge a second battery at least a portion of the charging current used to charge the first battery, wherein the first and second batteries are charged simultaneously only after the parameter of the first battery reaches a predetermined threshold.

2. The method according to claim 1, wherein the parameter is a battery voltage or a battery temperature rate.

3. The method according to claim 1, wherein the predetermined threshold is a predetermined battery voltage or a predetermined battery temperature rate.

4. The method according to claim 1, wherein the charging current used to charge the first battery has a maximum value until the parameter of the first battery reaches the predetermined threshold.

5. The method according to claim 4, further comprising the step of decreasing the charging current used to charge the first battery after the parameter of the first battery reaches the predetermined threshold, wherein the charging current used to charge the first battery decreases from a maximum value to a minimum value.

6. The method according to claim 5, wherein the charging current used to charge the first battery decreases to at least one intermediate value as the charging current used to charge the first battery decreases to the minimum value.

7. The meThod according to claim 6, wherein the portion of the charging current that is diverted to charge the second battery has a value of the difference of the maximum value of the charging current previously used to charge the first battery and the intermediate value of the charging current used to charge the first battery.

8. The method according to claim 7, further comprising the step of increasing the portion of the charging current that is diverted to charge the second battery, wherein the portion of the charging current that is diverted reaches the maximum value when the charging current used to charge the first battery reaches the minimum value.

9. The method according to claim 1, wherein the first battery is coupled to a portable electronic device and the second battery is attachable to the portable electronic device, wherein the method further comprises the step of coupling the portable electronic device and the second battery to corresponding receptacles of a dual pocket charger.

10. A method of charging a set of batteries, comprising the steps of:
- charging a first battery with a charging current from a power supply;
- monitoring the charging current used to charge the first battery; and
- in response to a change in a magnitude of the charging current, selectively diverting to charge a second battery at least a portion of the charging current used to charge the first battery, wherein the first and second batteries are charged simultaneously only after the change in the magnitude of the charging current used to charge the first battery.

11. A system for charging a set of batteries, comprising:
- at least one receptacle for charging a first battery with a charging current from a power supply; and
- a processing unit, wherein the processing unit is programmed to:
  - monitor a parameter of the first battery as the first battery is being charged with the charging current; and
  - selectively divert to charge a second battery at least a portion of the charging current used to charge the first battery when the processing unit detects that the parameter of the first battery reaches a predetermined threshold, wherein the first and second batteries are charged simultaneously only following the detection.

12. The system according to claim 11, wherein the parameter is a battery voltage or a battery temperature rate.

13. The system according to claim 11, wherein the predetermined threshold is a predetermined battery voltage or a predetermined battery temperature rate.

14. The system according to claim 11, wherein the charging current used to charge the first battery has a maximum value until the processing unit detects that the parameter of the first battery has reached the predetermined threshold.

15. The system according to claim 14, wherein the processing unit is further programmed to decrease the charging current used to charge the first battery after the processing unit detects that at least one of the battery voltage and the battery temperature of the first battery reaches the predetermined threshold, wherein the processing unit decreases the charging current used to charge the first battery from a maximum value to a minimum value.

16. The system according to claim 15, wherein the processing unit is further programmed to decrease to at least one intermediate value the charging current used to charge the first battery as the charging current used to charge the first battery decreases to the minimum value.

17. The system according to claim 16, wherein the portion of the charging current that the processing unit diverts to charge the second battery has a value of the difference of the maximum value of the charging current previously used to charge the first battery and the intermediate value of the charging current used to charge the first battery.

18. The system according to claim 17, wherein the processing unit is further programmed to increase the portion of the charging current that is diverted to charge the second battery, wherein the portion of the charging current that is diverted reaches the maximum value when the charging current used to charge the first battery reaches the minimum value.

19. The system according to claim 11, further comprising a second receptacle, wherein the first battery is coupled to a portable electronic device and the second battery is attachable to the portable electronic device, wherein the portable electronic device and the second battery are respectively coupled to the first receptacle and the second receptacle, and wherein the first and second receptacles are part of a dual pocket charger.

20. A charger for charging a set of batteries, comprising:
- at least one receptacle for charging a first battery with a charging current from a power supply; and
- a processor, wherein the processor is programmed to:
  - monitor the charging current used to charge the first battery; and
  - selectively divert to charge a second battery at least a portion of the charging current used to charge the first battery in response to a change in the magnitude of the charging current used to charge the first battery, wherein the first and second batteries are charged simultaneously only after the change in the magnitude of the charging current used to charge the first battery.

* * * * *